(12) United States Patent
Jones et al.

(10) Patent No.: US 7,864,629 B2
(45) Date of Patent: Jan. 4, 2011

(54) MONOPOLE ACOUSTIC TRANSMITTER COMPRISING A PLURALITY OF PIEZOELECTRIC DISCS

(75) Inventors: Dale A. Jones, Houston, TX (US); Medhat W. Mickael, Sugar Land, TX (US)

(73) Assignee: Precision Energy Services, Inc., Fort Worth, TX (US)

(*) Notice: Subject to any disclaimer, the term of this patent is extended or adjusted under 35 U.S.C. 154(b) by 439 days.

(21) Appl. No.: 11/943,185

(22) Filed: Nov. 20, 2007

(65) Prior Publication Data

US 2009/0129203 A1 May 21, 2009

(51) Int. Cl.
*G01V 1/40* (2006.01)
(52) U.S. Cl. .......................................... 367/25; 181/102
(58) Field of Classification Search ................... 367/25, 367/31, 32; 181/102
See application file for complete search history.

(56) References Cited

U.S. PATENT DOCUMENTS

| | | | |
|---|---|---|---|
| 3,541,502 A | | 11/1970 | Behrendt et al. |
| 4,364,117 A | | 12/1982 | Snow |
| 4,450,540 A | | 5/1984 | Mallett |
| 4,682,308 A | | 7/1987 | Chung |
| 4,932,003 A | * | 6/1990 | Winbow et al. ............... 367/75 |
| 4,996,674 A | | 2/1991 | Thompson |
| 5,030,873 A | * | 7/1991 | Owen ......................... 310/337 |
| 5,043,952 A | | 8/1991 | Hoyle |
| 5,063,542 A | * | 11/1991 | Petermann et al. .......... 367/166 |
| 5,265,067 A | * | 11/1993 | Chang ........................ 367/31 |

(Continued)

FOREIGN PATENT DOCUMENTS

EP    0 679 910 A3    11/1995

(Continued)

OTHER PUBLICATIONS

Inoue, et al. Low Frequency Flextensional Piezoelectric Transmitter With Displacement Amplifier. IEEE 1987.*

(Continued)

*Primary Examiner*—Ian J Lobo
(74) *Attorney, Agent, or Firm*—Wong, Cabello, Lutsch, Rutherford & Brucculeri, L.L.P.

(57) ABSTRACT

A monopole acoustic transmitter with at least one disc assembly with a plurality of piezoelectric discs configured to optimized acoustic pressure output within a desired frequency range while meeting physical restrictions of LWD and MWD logging systems. The transmitter is disposed in a recess or "slot" in the perimeter of a logging tool housing to reduce acoustic pressure waves transmitted directly along the tool housing and to optimize acoustic energy transmission into the borehole environs. In order to increase acoustic pressure output at a desired logging frequency range, the plurality of piezoelectric discs in each of at least one disc assembly are connected electrically in parallel and fired simultaneously. The polarity of the discs and the wiring arrangement are such that each disc expands or contracts in a common direction during simultaneous firing by an applied voltage. The desired output frequency is obtained by selectively polarizing and dimensioning the discs within the one or more disc assemblies. Each disc assembly is preferably disposed within an oil filled pressure housing that is pressure and temperature compensated. The axis of the at least one disc assembly can be parallel or perpendicular to the major axis of the logging tool.

14 Claims, 6 Drawing Sheets

U.S. PATENT DOCUMENTS

| | | | |
|---|---|---|---|
| 5,373,481 A * | 12/1994 | Orban et al. ............... 367/82 |
| 5,387,767 A * | 2/1995 | Aron et al. ............... 367/25 |
| 5,477,101 A | 12/1995 | Ounadjela |
| 5,635,685 A | 6/1997 | Tierce et al. |
| 5,644,186 A | 7/1997 | Birchak |
| 5,753,812 A | 5/1998 | Aron |
| 6,102,152 A | 8/2000 | Masino |
| 6,147,932 A | 11/2000 | Drumheller |
| 6,213,250 B1 | 4/2001 | Wisniewski |
| 6,631,327 B2 | 10/2003 | Hsu |
| 6,671,224 B1 | 12/2003 | Pabon |
| 6,697,298 B1 | 2/2004 | Dubinsky |
| 7,207,397 B2 | 4/2007 | Miyamoto |
| 2006/0001334 A1 | 1/2006 | Shiba |

FOREIGN PATENT DOCUMENTS

WO     2004028202 A1     4/2004

OTHER PUBLICATIONS

European Search Report received in corresponding application No. GB0815282.9 dated Dec. 19, 2008.

J. C. Adamowski, et al.—Combination of analytical and finite element methods to obtain acoustic fields in complex structures driven by piezoelectric multi-layered transducers'; Ultrasonics Symposium, 1997. Proceedings., 1997 IEEE Toronto, Ont., Canada Oct. 5-8, 1997.

Great Britain Search Report received in corresponding application No. GB0815282.9 dated Dec. 9, 2009.

* cited by examiner

MONOPOLE ACOUSTIC TRANSMITTER COMPRISING A PLURALITY OF PIEZOELECTRIC DISCS

FIELD OF THE INVENTION

This invention is related to systems for measuring an acoustic property of material penetrated by a well borehole. More particularly, the invention is related to improved acoustic transmitters for use with acoustic logging-while-drilling (LWD) or measurement-while-drilling (MWD) borehole assemblies.

BACKGROUND

Acoustic logging systems are routinely used in the oil and gas industry to measure formation acoustic properties of earth formation penetrated by a well borehole. These properties include the compressional and shear velocities of the formation, which are subsequently used to determine a variety of formation parameters of interest such as porosity and pore pressure. Additionally, acoustic logging systems are used to produce acoustic images of the borehole from which well conditions and other geological features can be investigated. Other applications of acoustic logging measurements include seismic correlation and rock mechanic determination.

The downhole instrument or borehole "tool" of an acoustic logging system typically comprises one or more sources of acoustic pressure or "transmitters", and one or more acoustic receivers. The transmitters and receivers are typically spaced axially on the body of the tool. Multiple transmitters and/or receivers can also be disposed at different radial positions around the tool. A portion of the energy emitted by the one or more transmitters propagates through formation material surrounding the borehole, and is subsequently detected by the one or more receivers. Receiver response is then used to determine properties and parameters of interest.

Frequencies used in monopole acoustic LWD tools are typically in the 5 to 20 kiloHertz (KHz) range. In order to improve accuracy and precision of measured acoustic information; it is desirable to employ one or more transmitters that have the highest acoustic pressure output at the desired output frequency.

Logging-while-drilling (LWD) and measurement-while-drilling (MWD) tools impose severe limitations that affect the energy and frequency output of a monopole acoustic transmitter disposed within the wall of the tool and operating at a desired frequency. Some of these limitations are discussed briefly in the following paragraphs.

If the transmitter comprises piezoelectric transducers, the acoustic pressure output of an acoustic transmitter is proportional to the dimensions and the configuration of the transmitter. In order to maximize the amount of energy reaching the borehole environs and minimize the propagation of acoustic energy along the tool, it is preferred to dispose the transmitter as near as possible to the outer periphery of the tool. It is, therefore, desirable to dispose the transmitter within a recess "port" or "pocket" in the outer surface of the tool housing wall. A LWD tool housing is typically a drill collar. For structural strength reasons, it is necessary to restrict the radial depth and azimuthal width of a recess to a minimum. The axial length of a recess is not as tightly constrained from a structural strength perspective. These dimensional restrictions of the recess therefore govern the maximum radial, azimuthal and axial dimensions of a transmitter that can be disposed within the wall of an LWD tool. These restrictions, in turn, affect the acoustic pressure and frequency output of the transmitter.

The frequency output and the acoustic energy output of a piezoelectric element are both a function of the geometry and dimensions of the piezoelectric element. It is often difficult to obtain sufficient energy at the desired frequency from a transmitter consisting of a piezoelectric element. Moreover, space required to fasten, seal, and mechanically and electrically isolate a transmitter in the wall of a logging tool of any type adds additional limiting factors to the transmitter dimensions and therefore to the transmitter outputs. In addition, the transmitter must be covered to protect it from mechanical damage during drilling operations that include handling, drilling and tripping of the drill string.

In summary, a piezoelectric transmitter must be dimensioned and geometrically configured to operate within a tool in harsh borehole conditions. The structure required to operationally dispose the transmitter within the wall of the tool (such as a drill collar) imposes additional transmitter dimensional restrictions that, in turn, affect energy and frequency output of the transmitter.

In view of the brief background discussion, there is a need for a monopole transmitter with optimized acoustic pressure output, with output frequency optimized to fall within a desired frequency range, and with a physical configuration suitable to meet structural restrictions of LWD and MWD logging systems.

SUMMARY OF THE INVENTION

The invention is a monopole acoustic transmitter comprising a plurality of piezoelectric discs. More specifically, the transmitter comprises a stack disc assembly comprising a plurality of thin piezoelectric discs each with a hole in the center. The discs are held together under constant compressional force by a clamping apparatus, such as a bolt, passing through the hole in each disc and terminated at each end by a first and a second end cap, respectively. The discs are electrically connected using either conductive epoxy or copper shims between the major surfaces of adjacent discs. Polarity and electrical wiring of the disc assembly is such that all discs expand or contract simultaneously upon application of a voltage to the disc assembly. End caps made of different materials are installed at each end of the stack to control the pressure output and frequency of the transmitter.

The transmitter is disposed on the perimeter of a logging tool housing to reduce acoustic pressure waves transmitted directly along the tool housing and to optimize acoustic energy transmission into the borehole environs. Acoustic energy that propagates from the transmitter and directly along the logging tool housing is typically referred to as the "tool mode signal". Embodied as a LWD acoustic logging system, the logging tool housing is typically a steel drill collar. Deposition of the acoustic transmitter within the wall of the drill collar does not interfere with drilling fluid flow through the interior of the drill collar.

The transmitter can be disposed with the major axis of the transmitter either axially (parallel to) or radially (perpendicular to) to the major axis of the drill collar within a recess "port" or "pocket" in the outer surface of the tool housing. If the transmitter is disposed axially in the tool housing, a flextensional member is installed to transfer the energy from the axial to the radial direction. If the transmitter is disposed radially in the drill collar, the pressure output of the transmitter is along transmitter axis, but radial to the major axis of the drill collar. Radial deposition is the preferred embodiment.

The end caps attached to the two ends of the transmitter can be configured to meet previously mentioned structural restrictions on the radial depth and azimuthal width of the recess while obtaining the suitable output at a desired frequency. Another transmitter configuration consists of two stacks of discs axially aligned but spaced radially apart from each other and connected with an arch-shaped mass. The two disc assemblies comprise first and second end caps that can be configured to control the frequency, output, and signal directionality.

The stacked piezoelectric disc acoustic transmitter acts as a spring mass system. The frequency of the disc assembly is largely a function of the length of the disc assembly and the mass of the end caps attached at the ends. The length of the disc assembly can be adjusted within reasonable limits as long as the overall length does not introducing serious tool housing structural problems. The acoustic output of the disc assembly is a function of the number of disc comprising the disc assembly, the thickness and diameter of the discs, and the force applied on the stack. Furthermore, output frequency and directionality of the acoustic output can be adjusted by varying the mass and geometry of the first and second end cap masses. By maximizing acoustic pressure output at a desired frequency, a disc assembly can be configured to maximize the precision of measured acoustic parameters of interest.

The disc assembly is disposed in a pressure-compensated housing filled with oil thereby forming the transmitting element of a monopole acoustic transmitter suitable for borehole applications.

BRIEF DESCRIPTION OF THE DRAWINGS

The manner in which the above recited features and advantages, briefly summarized above, are obtained can be understood in detail by reference to the embodiments illustrated in the appended drawings.

FIG. 12 conceptually illustrates the axial intensity distribution of the pressure output signal from the single disc assembly transmitter shown in FIGS. 10 and 11; and.

DETAILED DESCRIPTION OF THE PREFERRED EMBODIMENTS

An acoustic LWD logging tool typically comprises one or more acoustic transmitters and one or more acoustic receivers.

Figure 1:
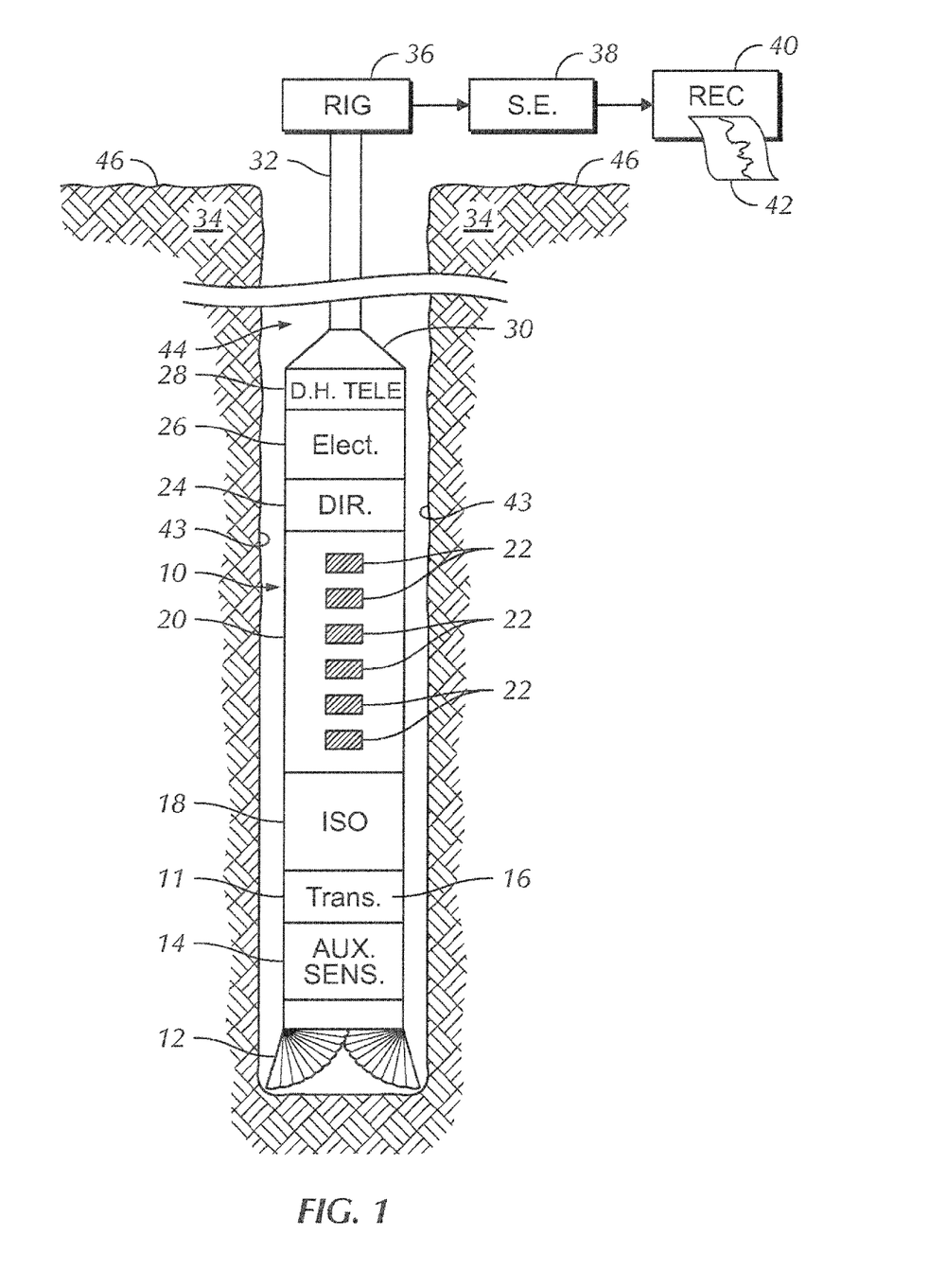
FIG. 1 illustrates the invention embodied as an LWD acoustic system disposed in a borehole drilling environment.

FIG. 1 illustrates a single acoustic transmitter embodied as an LWD acoustic system disposed in a borehole drilling environment. The LWD borehole instrument or "tool" component of the borehole assembly is designated as a whole by the numeral 10, and comprises a tool pressure housing 11 which is typically a drill collar. The tool 10 is disposed within a well borehole 44 defined by borehole walls 43 and penetrating earth formation 34. A drill bit 12 terminates a lower end of the tool 10, and a connector 30 terminates an upper end of the tool. The connector 30 operationally connects the tool 10 to a lower end of a drill string 32. The upper end of the drill string terminates at a rotary drilling rig 36, which is known in the art and is illustrated conceptually at 36.

Again referring to FIG. 1, the tool 10 comprises a transmitter section 16 and a receiver section 20. An acoustic isolation section 18, which reduces the tool mode signal, separates the transmitter section 16 from the receiver section 20. The receiver section 20 comprises a plurality of receivers 22 axially spaced from the transmitter section 16. Six receivers are illustrated, although more or fewer receivers can be used. The receivers 22 are also shown axially aligned, although axial alignment is not required as will be discussed in a subsequent section of this disclosure.

Still referring to FIG. 1, the tool 10 can comprise other elements that can be used to complement measurements made with the acoustic transmitter section 16 and the receiver section 20. In the embodiment shown in FIG. 1, the tool comprises an optional directional section 24 that provides a real time measure of azimuthal angle therefore provides azimuthal orientation of the tool 10 within the borehole 44. The tool 10 can optionally comprise an auxiliary sensor section 14 with one or more auxiliary sensors responsive to a variety of borehole environs parameters. It should be understood that operation of the monopole acoustic transmitter disclosed herein does not require measurements from the directional section 24 or from the auxiliary sensor section 14.

Once again referring to FIG. 1, an electronics section 26 provides power and control circuitry for the acoustic transmitter section 16, receiver section 20, the optional directional section 24, and any optional auxiliary sensors in the auxiliary sensor section 14. Power is typically supplied by batteries, but may be supplied by a mud powered turbine generator (not shown). The electronics section 26 is operationally connected to a down-hole telemetry unit 28. Data from elements within the tool 10, whether processed downhole as parameters of interest or in the form of "raw" data, are telemetered to the surface 46 of the earth by means of a suitable telemetry system. Suitable telemetry systems include a mud pulse system, and electromagnetic telemetry system, or an acoustic telemetry system that uses the drill string 32 as a data conduit. The telemetered data are received by an up-hole telemetry element (not shown) preferably disposed in a surface equipment module 38. As the borehole assembly comprising the logging tool 10 is conveyed along the borehole 44 by the drill string 32, one or more parameter of interest, or alternately raw data, are input to a recorder 40. The recorder 40 tabulates the data as a function of depth within the borehole 44 at which they are measured. The recorder output 42 is typically a "log" of the data as a function of borehole depth. The data can alternately be recorded in down-hole processor memory (not shown), and subsequently downloaded to the surface equipment module 38 when the tool 10 is returned to the surface 46 during or after the drilling operation is completed. The downloaded data are typically processed further within the surface equipment module 38 to obtain additional parameters of interest that cannot be determined in the down-hole processor unit.

As stated previously, the tool housing 11 is typically a steel drill collar with a conduit through which drilling fluid flows. Elements of the tool 10 illustrated conceptually in FIG. 1 are typically disposed within the wall of the drill collar pressure housing 11.

The monopole acoustic transmitter(s) disclosed herein comprise a disc assembly comprising a plurality or "stack" of piezoelectric disc elements. Pressure output of the disc assembly is greater than pressure output from a single disc comprising the assembly. Dimensions of individual discs, the disc assembly, and end caps cooperating with the stack of discs are adjusted to obtain maximum acoustic pressure output at a frequency suitable for acoustic logging. These dimensions must, however, meet structural strength and other environmental requirements necessitated by a borehole acoustic logging embodiment.

Figure 2:
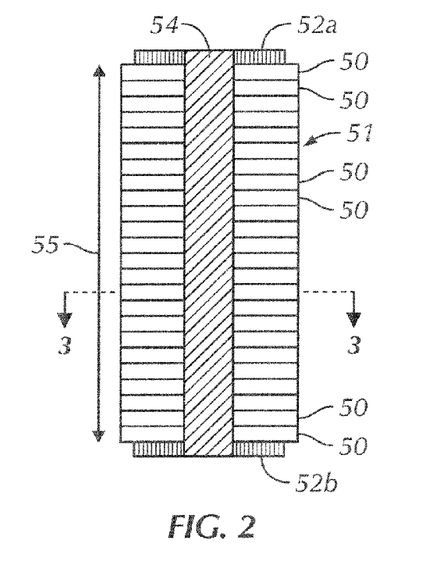
FIG. 2 is a cross sectional view of a disc assembly comprising a plurality of discs.

FIG. 2 is a cross sectional view of a disc assembly 51 comprising a plurality of discs 50. Preferably 10 to 20 discs 50 comprise the disc assembly 51. The number of discs that can be used is determined somewhat by the assembly embodiment, as will be discussed in subsequent sections of this disclosure. The assembly is held together under constant compressional force by a clamping mechanism comprising a rod 54, such as a metal bolt, passing through a hole in each disc (see FIG. 3). The rod 54 is electrically insulated from the discs and from the electrical conducting material separating the disc. The ends of the rod 54 are terminated by a first mass end cap 52a and a second mass end cap 52b, respectively. The length of the disc assembly 51 is designated at 55.

Figure 3:
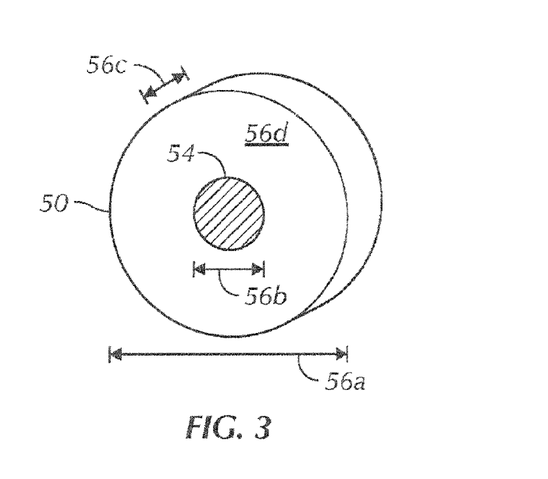
FIG. 3 is a perspective view of a single piezoelectric disc.

FIG. 3 is a perspective view A-A of the disc assembly 51 shown in cross section in FIG. 2. The outside diameter of the disc 50 is shown at 56a. The disc has a center hole of inside diameter 56b. The thickness of the disc is shown at 56c. The rod 54 passes through and preferably fits tightly in the hole in center of the disc. It is noted that the normal of the illustrated disc surface 56d is parallel to the axis of the rod 54. By definition, the major axis of the disc assembly 51 is coincident with the major axis of the rod 54.

There are alternate techniques for applying clamping force to the disc elements of the disc assembly. As an example, an alternate clamping mechanism comprises a cylindrical housing in which a plurality of hollow or solid discs is disposed. A threaded ring is then used to apply an equivalent claming force to the disc assembly. It should be understood that other clamping mechanisms can be used to apply clamping force to the disc assembly.

Considering both FIGS. 2 and 3, the acoustic output of the disc assembly 51 is a function of the length 55, number of discs 50 comprising the disc assembly, the diameter 56a and thickness 56c of the discs, and the force applied on the stack by the rod 54 cooperating with the end caps 52a and 52b. Furthermore, output frequency and directionality of the acoustic output can be adjusted by varying the mass and geometry of the first and second end caps 52a and 52b. As an example, the force and end plate masses can be selected so that a disc assembly of length of 3.0 inches (7.62 centimeters) comprising 10 discs of diameter 1.0 inches (2.54 centimeters) yields a monopole frequency output in the range of 10 to 12 KHz at 2 to 3 KiloPascals (KPa) at 39.4 inches (1.0 meter) and at an input voltage of 1000 volts. These output parameters are desirable for acoustic logging applications.

Figure 4:
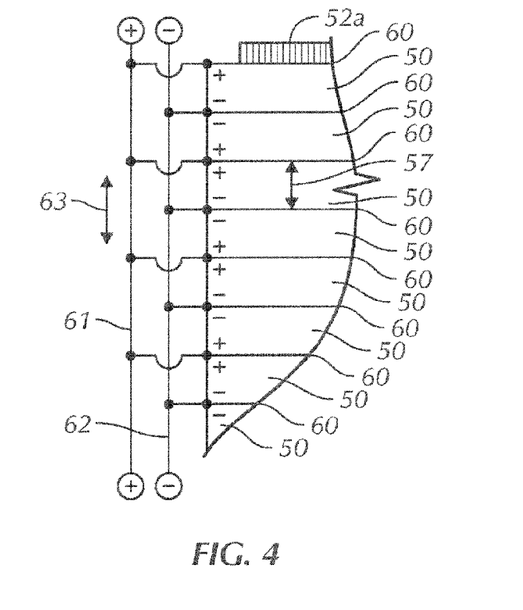
FIG. 4 illustrates in detail the polarization and electrical wiring of discs in a disc assembly.

FIG. 4 shows in more detail a portion of the disc assembly 51, and illustrates the polarization and electrical wiring of the disc assembly. The discs 50 are electrically connected using either conductive epoxy or copper shims 60 between the major surfaces 56d (see FIG. 3) of each adjacent disc. The polarizations of the individual discs 50 are indicated by "+" and "−". Electrical connections to the disc assembly 51 are such that all discs 50 expand or contract simultaneously upon application of a voltage to the assembly 51. As an example, a positive voltage applied to the electrical bus 61 expands the assembly in the axial direction, while a negative voltage applied to the electrical bus 62 contracts the assembly in the axial direction, as illustrated conceptually by the arrow 63.

Radial Transmitter Configurations

Figure 5:
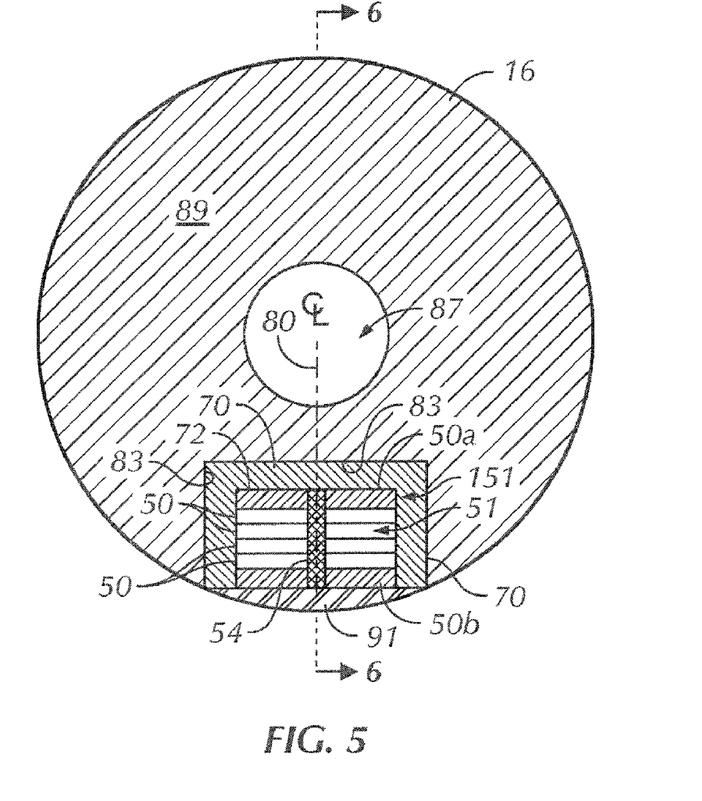
FIG. 5 is a cross sectional view of a logging tool transmitter section showing a single transmitter comprising a single disc assembly disposed radially within the tool section wall.

FIG. 5 is a cross sectional view of the transmitter section 16 (see FIG. 1) illustrating an acoustic monopole transmitter 151 disposed radially therein. The transmitter 151 comprises a disc assembly 51 of the type shown in FIGS. 2 through 4. The disc assembly 51 is housed in a pressure housing 72 that is preferably filled with oil and is pressure and temperature balanced. By definition, the major axis of the transmitter 151 is coincident with the major axis of the disc assembly 51. The transmitter 151 comprising the disc assembly 51 and pressure housing 72 is disposed within a recess or essentially cylindrical "slot" (defined by the surfaces 83) in the outer surface of the wall 89 of the transmitter section 16 of the tool 10. Material 70 mechanically and acoustically isolates the transmitter 151 from the wall 89 of the transmitter section 16. A cover 91 protects the pressure housing 72 from abrasion encountered in the borehole environment. The cover is illustrated as a hatch, but desired protection could also be obtained with a circumferential sleeve. The transmitter 151 is oriented so that the major axis of the transmitter is essentially perpendicular to the major axis of the transmitter section 16 and thus perpendicular to the major axis of the tool 10. In this illustration, the disc assembly Still referring to FIG. 5, the cover 91 is configured so that it acoustically couples the transmitter 151 to the borehole environs. The axial centerline of the transmitter 151 is shown at 80, and will be referenced in a subsequent discussion.

Again referring to FIG. 5, the transmitter section 16 of a LWD tool 10 is typically a steel drill collar comprising a wall 89 and a conduit 87 through which drilling fluid flows. For a transmitter section 16 that has an outer diameter of about 7 inches (17.8 centimeters) and a wall thickness of less than 3 inches (7.6 centimeters), it is necessary to restrict the dimensions of the recess slot defined by the surfaces 83. More specifically, it is desirable to restrict the depth of slot to less than half of the wall thickness, to restrict the azimuthal arc of the slot to 2 inches (5.1 centimeters) or less, and to restrict the axial length of the slot to 6 inches (15.2 centimeters) or less. These structural restrictions set the maximum dimensions of the transmitter 151 (and on other embodiments of the transmitter) that can be disposed within the wall of an LWD tool and, therefore, affect the energy and frequency outputs of the transmitter. Stated another way, physical restrictions on the recess slot housing the transmitter 86 affect the frequency and energy outputs of the transmitter.

As discussed previously, individual discs 50 comprising the disc assembly 51 are polarized, configured and electrically connected to emit a pressure pulse in a common direction upon application of a voltage to the transmitter assembly.

Figure 6:
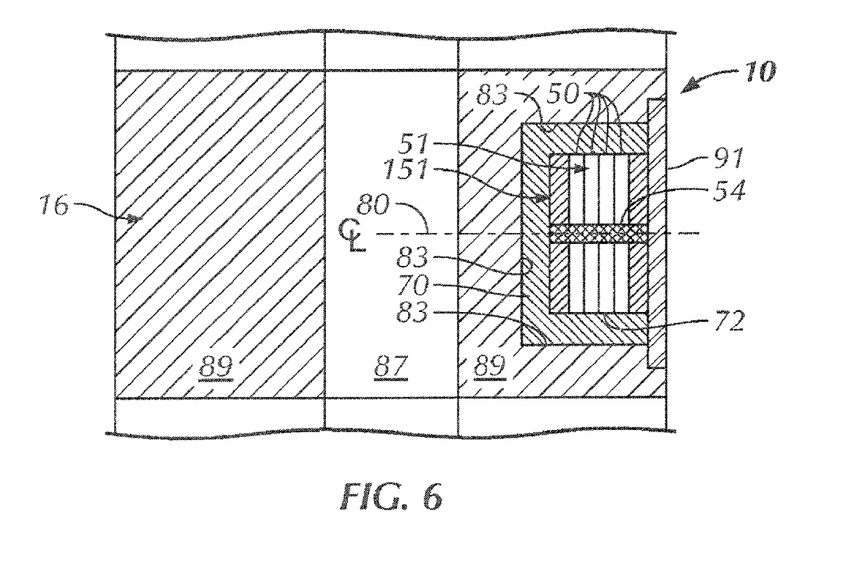
FIG. 6 is a sectional view at A-A of the transmitter section comprising a single disc assembly and depicted in FIG. 5.

FIG. 6 is a sectional view at A-A of the transmitter section 16 depicted in FIG. 5. The acoustic monopole transmitter 151 disposed therein is shown from this perspective with all elements and their identifying numbers being defined in the discussion of FIG. 5.

Consider now both FIGS. 5 and 6. Recall that the output of the transmitter assembly 151 is a function of the piezoelectric material used in the discs 50, the material and dimensions if the mass end caps 52a and 52b, the material and dimensions of the rod 54, and the force applied to the disc assembly 51 by the end caps 52a and 52b cooperating with the rod 54. These parameters are adjusted so that a disc assembly is about 3 inches (7.6 centimeters) in length and has an operating frequency of 10-12 KHz. This frequency range is ideal for monopole acoustic logging applications. The thickness mode frequency of a 0.125 inches (0.32 centimeters) thick disc is in the megahertz range and does not penetrate far from the transmitter 151. Therefore, in a LWD tool in a borehole environment, the thickness mode of the discs within a disc assembly has no effect on the measurement made using the length mode. A disc with a diameter of 1.5 inches (3.8 centimeters) has a frequency in the range of 40 to 50 KHz in the radial mode. In order for this frequency not to interfere with the length mode frequency, the diameters of discs within a disc assembly should be kept at a maximum of 1.5 inches (3.8 centimeters).

Figure 7:
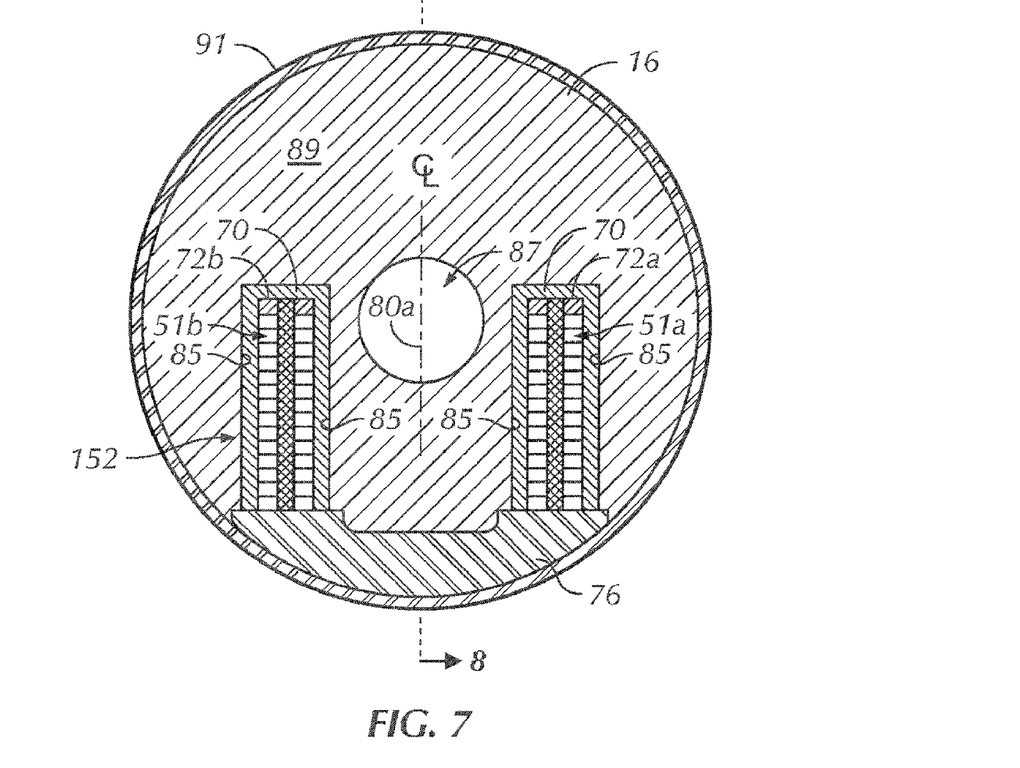
FIG. 7 is a cross sectional view of a logging tool transmitter section showing a single transmitter comprising a dual disc assembly disposed radially within the tool section wall and connected with an arch-shaped front mass.
Figure 8:
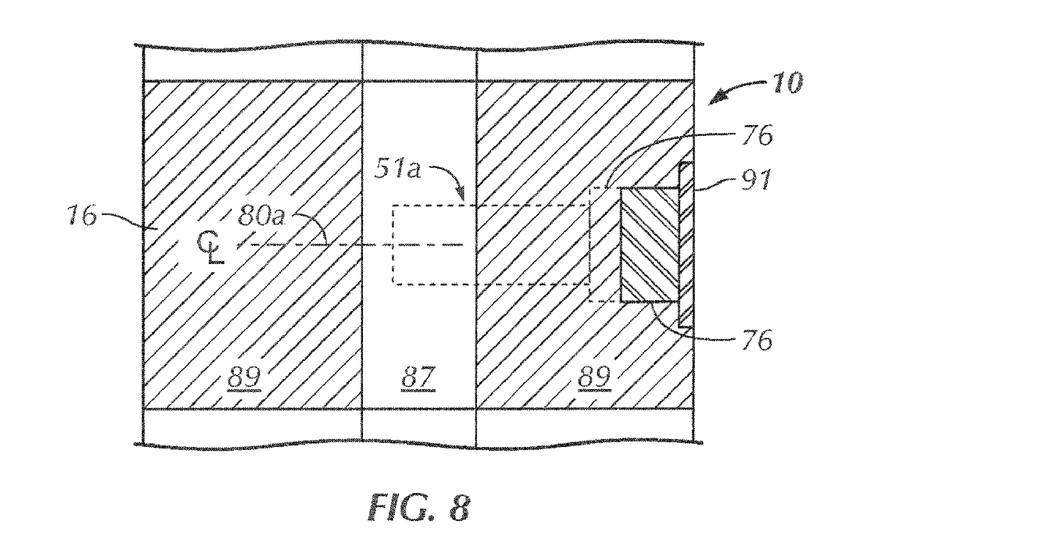
FIG. 8 is a sectional view at A-A of the transmitter section comprising the dual disc assembly and depicted in FIG. 7.

A second embodiment of the transmitter comprises two disc assemblies joined by an arch-shaped mass structure. Attention is directed to FIG. 7 which illustrates a cross sectional view of this dual disc radial assembly, hereafter referred to as the "dual radial assembly" transmitter and denoted as a whole by the numeral 152. More specifically, the dual radial assembly transmitter comprises two disc assemblies 51a and 51b, with each assembly being disposed in pressure housings 72a and 72b, respectively. The construction of each disc assembly is essentially the same as that shown for the single disc assembly 51 illustrated in FIGS. 5 and 6, with the exception of the front mass cap. Some identifier numbers have, however, been omitted for clarity. The axes of the disc assemblies 51a and 51b are parallel, are each perpendicular to the major axis of the transmitter section 16, and are axially aligned within the transmitter section.

The arch-shaped mass structure 76 acoustically couples the two disc assemblies 51a and 51b such that the end caps 50b, used in previously discussed disc assembly embodiments, are not used in the dual radial assembly. The arch-shaped mass structure 76 functions as one end cap for each of the two disc assemblies. The mass structure 76 is affixed to the stack assemblies 51a and 51b by the assembly rods 54 (see FIG. 2) which preferably extend through the mass structure and are terminated by suitable fasteners such as nuts 54a and 54b. The arch-shaped mass structure thereby physically and acoustically couples the stack assemblies 51a and 51b. The dual radial assembly is disposed in a recess slot in the outer surface of the wall 89 of the transmitter section 16. The recess slot is defined by the surfaces 83. As in the previous transmitter embodiment, material 70 lining portions of the recess slot isolate the disc assemblies 51a and 51b mechanically and acoustically from the wall 80 of the transmitter section 16.

Both transmitters are operated simultaneously so that all discs 50 in each disc assembly 51a and 51b emit acoustic pressure pulses of the same polarity into the surrounding borehole environs. The dual radial assembly transmitter 152 is acoustically coupled to the borehole environs through the arch-shaped mass structure 76. Because of geometric constraints, the lengths of disc assemblies in the dual radial assembly transmitter 152 (see FIG. 7) are greater than the length of the disc assembly used in the single radial disc assembly transmitter 151 (see FIG. 5). The arch-shaped mass structure is also greater than the outer mass 50b of the single disc assembly. This results in the dual radial assembly transmitter operating at more than twice the pressure output of the single disc assembly transmitter and further operating at a more optimum frequency range.

Referring to FIG. 5, two acoustically uncoupled single stack assemblies (not shown) could be disposed within the drill collar 87 similar to the deposition of the stack assemblies 51a and 51b shown in FIG. 7. This would allow the length of each single stack assembly to be increased thereby increasing acoustic output. Each uncoupled single stack assembly could not, however, be azimuthally aligned with the plurality of receivers 22 axially spaced from the transmitter section 16 and shown in FIG. 1. This would result in signal distortion at the receivers 22. Distortion due to transmitter-receiver azimuthal misalignment is not a problem using the dual radial assembly transmitter 152. The arch-shaped mass 76 azimuthally focused to a single point outputs from the two stack assemblies 51a and 51b. This point is azimuthally aligned with the receivers 22.

Figure 9:
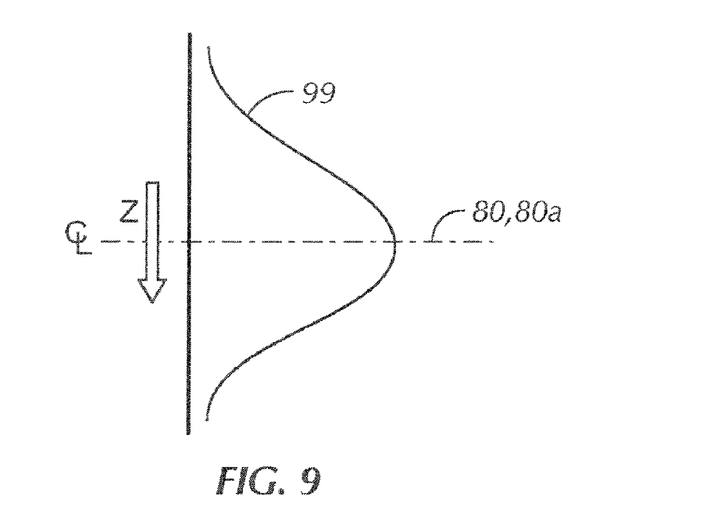
FIG. 9 conceptually illustrates the axial intensity distribution of the pressure output signal from the acoustic transmitters comprising both single and dual radial disc assemblies.

FIG. 9 conceptually illustrates the axial distribution of the intensity of the pressure output signal, operating in the length mode 11-13 KHz frequency range, from both the single disc assembly acoustic transmitter 151 and dual radial assembly transmitter 152. Curve 92 represents acoustic pressure intensity as a function of position along the Z axis. The axial centerlines 80 and 80a define the axial center of the transmitters 151 and 152 shown in FIGS. 5-6 and FIGS. 7-8, respectfully. It can be seen that the output is essentially a Gaussian distribution with a peak at the centerline 80. As mentioned previously, the output of the dual radial assembly transmitter 152 is more than twice the output of the single disc assembly acoustic transmitter 151.

Axial Transmitter Configurations

Figure 10:
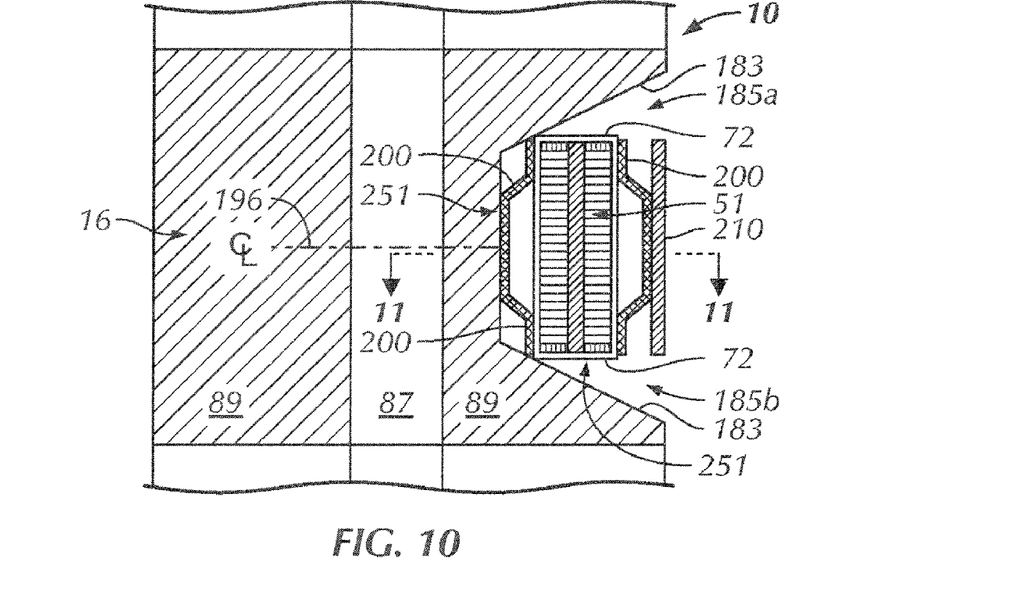
FIG. 10 is a cross sectional view of a logging tool transmitter section showing a single transmitter comprising a single disc assembly disposed axially within the tool section wall.

FIG. 10 is a cross sectional view of the transmitter section 16 (see FIG. 1) illustrating an acoustic monopole transmitter 251 disposed axially therein. The transmitter 251 comprises a disc assembly 51 of the type shown in FIGS. 2 through 4. The disc assembly 88 is again housed in a pressure housing 72 that is preferably filled with oil and is pressure and temperature balanced. The transmitter 251 also comprises a flextensional member 200 that surrounds the pressure housing 72. The flextensional member 200 is fabricated from spring type material such as metal leaves and functions to transfer the transmitted acoustic energy from the axial to the radial direction. By definition, the major axis of the transmitter 251 is coincident with the major axis of the disc assembly 51.

The transmitter 251 is disposed within a recess (defined by the surfaces 183) in the outer surface of the wall 89 of the transmitter section 16 of the tool 10. As in previously discussed embodiments, this recess will be referred to as a "pocket" or "slot". A cover 210 protects the transmitter 251 from abrasion encountered in the borehole environment. The transmitter 251 is oriented axially so that the major axis of the transmitter is parallel to the major axis of the transmitter section 16 and thus parallel to the major axis of the tool 10.

Still referring to FIG. 10, acoustic pulses generated by the transmitter 251 enter the borehole environments through the protective cover 210, which acoustically couples the transmitter to the borehole environs. Acoustic pulses can also enter the borehole environs through openings shown at 185a and 185b, which are typically filled with borehole fluid thereby acoustically coupling the transmitter 251 to the borehole environs. The axial centerline of the transmitter is shown at 196, and will be referenced in a subsequent discussion.

As stated previously, the transmitter section 16 of a typical LWD tool 10 is typically a steel drill collar comprising the wall 89 and the conduit 87 through which drilling fluid flows. Referring again to FIG. 10, consider a transmitter section 16 that has an outer diameter of about 7 inches (17.8 centimeters) and a wall thickness of less than 3 inches (7.6 centimeters). It is necessary for structural reasons to restrict the dimensions of the recess slot defined by the surfaces 183. As stated previously, it is desirable to restrict the depth of slot to less than half of the wall thickness, to restrict the azimuthal arc of the slot to 2 inches (5.1 centimeters) or less, and to restrict the axial length of the slot to 6 inches (15.2 centimeters) or less. These structural based recess restrictions set the maximum dimensions of a transmitter 251 that can disposed within the wall of an LWD tool and, therefore, affect the energy and frequency outputs of the transmitter. As in previous embodiments, physical restrictions on the recess slot housing the transmitter 251 affect the frequency and energy outputs of the transmitter.

As discussed previously, individual discs comprising the disc assembly 88 are polarized, configured and electrically connected to emit a pressure pulse in a common direction upon application of a voltage to the transmitter assembly.

Details of the basic disc assembly 51 have been illustrated (see FIGS. 2 and 3) and discussed in detail in a previous section of this disclosure.

Figure 11:
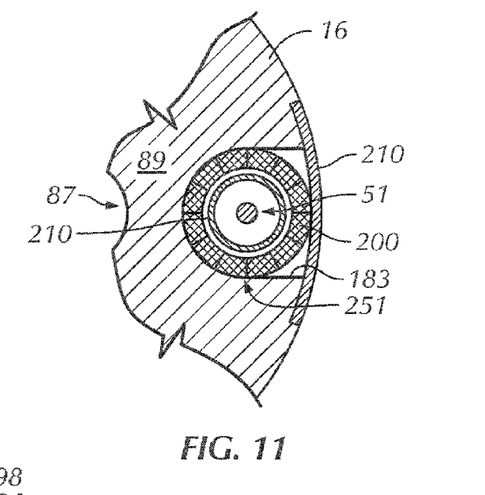
FIG. 11 is a sectional view at A-A of the transmitter section comprising a single disc assembly and depicted in FIG. 10.

FIG. 11 is a cross a partial cross sectional view A-A of the transmitter section 16 shown in FIG. 10. The transmitter 251 comprising the flextensional member 200 that surrounds the disc assembly 51 is shown disposed in the slot defined by surfaces 183 in the wall 89 of the transmitter section 16. The flextensional member 200 is fabricated from spring type material such as metal leaves and functions to transfer the transmitted acoustic energy from the axial to the radial direction. More specifically, the flextensional member 200 cooperates with the disc assembly 51 to direct a major component of acoustic energy radially into the borehole environs thereby minimizing an axial component which propagates along the borehole and the tool 10.

Figure 12:
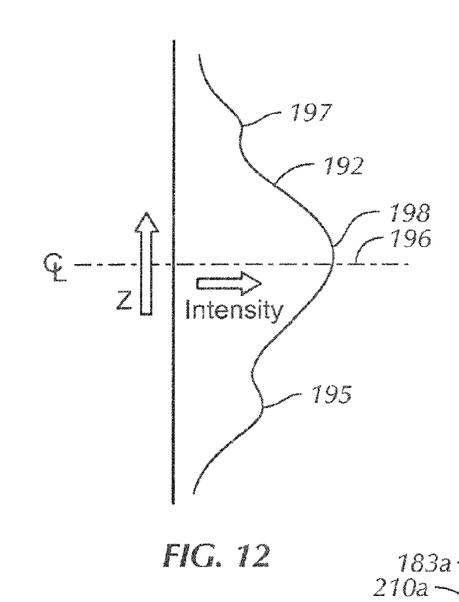

FIG. 12 conceptually illustrates the axial distribution of the intensity of the pressure output signal, operating in the length mode 11-13 KHz range, from the transmitter 251 depicted in FIGS. 10 and 11. Curve 192 represents acoustic pressure intensity as a function of position along the Z axis. The axial centerline 196 defines the axial center of the transmitter 251 shown in FIG. 10. There is a pronounced peak at 198 with two smaller excursions 197 and 195 on either side of the peak indicating that a major component of the output acoustic energy is directed radially into the borehole environs.

Figure 13:
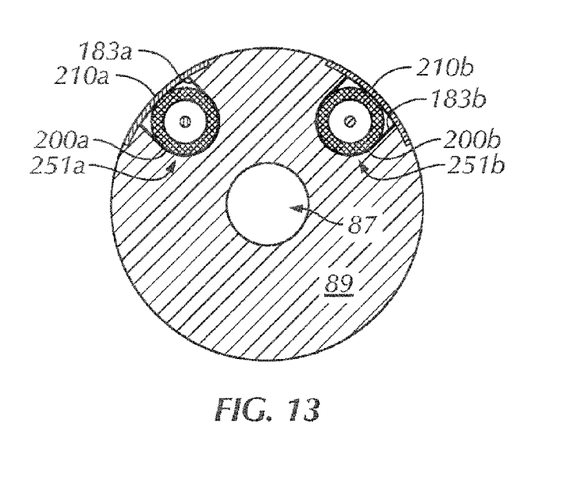
FIG. 13 is a cross sectional view of the transmitter section comprising dual axially disposed acoustic transmitters that are not acoustically coupled.

Optionally, the dimensions of a single axially oriented transmitter can be varied and the same pressure and frequency output can be obtained by using two transmitters. FIG. 13 is a cross sectional view of the transmitter section 16 showing two transmitters 251a and 251b disposed in two axially aligned slot recesses defined by the surfaces 251a and 251b, respectively. Both transmitters are operated simultaneously so that all discs in each transmitter emit acoustic pressure pulses of the same polarity into the surrounding borehole environs. Unlike the dual transmitter discussed previously and shown in FIGS. 7 and 8, the transmitters are not mechanically and directly acoustically coupled to each other. Both transmitters 251a and 251b are protected from abrasion by covers 210a and 210b, respectively, and are acoustically coupled to the borehole environs through corresponding flextensional members 200a and 200b, openings of the type depicted at 185a and 185b in FIG. 10, and through the covers 210a and 210b. In order to insure that the arrival of acoustic energy at the receiver section 20 (see FIG. 1) is not excessively broadened or phase shifted, it is desirable to use two receiver arrays, with a plurality of receivers 22 in each array azimuthally aligned with the normal of each transmitter 251a and 251b.

One drawback of this design is that the pressure signal is emitted in all directions. The spring elements that are oriented inward toward the tool body will generate acoustic pressure that might increase the tool body mode. An alternate flextensional device can be structured to flex in all radial directions but to only generate significant pressure in a direction that is radially outward from the major axis of the logging tool.

The above disclosure is to be regarded as illustrative and not restrictive, and the invention is limited only by the claims that follow.

What is claimed is:

1. A LWD logging tool acoustic transmitter comprising:
a first and a second disc assembly each comprising
a plurality of piezoelectric discs, and
a clamping mechanism cooperating with a first end cap and a second end cap to exert a compressional force upon said disc assembly; and
an arch-shaped mass; wherein
said at each said disc assembly is disposed in a pressure housing in a recess in an outer surface defining a wall of said logging tool;
said discs are polarized and configured physically and electrically to emit a pressure pulse from each said disc in a common direction upon application of a voltage to said at least one disc assembly; and
each said disc assembly is disposed in said recess such that the axis of each said disc assembly is perpendicular to the major axis of said logging tool; wherein:
axes of said first and said second disc assemblies are parallel and radially aligned; and
a first end of said arch-shaped mass functions as said first end cap of said first disc assembly and a second end of said arch-shaped mass functions as said first end cap of said second disc assembly thereby acoustically coupling and mechanically connecting said first and said second disc assemblies.

2. The transmitter of claim 1 wherein said arch-shaped mass cooperates with said first and said second disc assemblies to direct acoustic energy from said first and said second disc assemblies into borehole environs.

3. The transmitter of claim 1 wherein said arch-shaped mass cooperates with said first and said second disc assemblies to direct acoustic energy from said first and said second disc assemblies outward from said major axis of said logging tool.

4. The transmitter of claim 1 wherein said said first and said second disc assemblies are dimensioned and configured to emit an acoustic pulse at a predetermined pressure and at a predetermined frequency upon application of a voltage to said disc assemblies.

5. The transmitter of claim 1 wherein major surfaces of said discs are bonded with intervening layers of conducting material.

6. The transmitter of claim 1 wherein said first and said second disc assemblies are dimensioned and configured to operate at a frequency of about 8 to 15 kHz.

7. The transmitter of claim 1 wherein said first and said second disc assemblies are dimensioned and configured to yield a pressure output in a range of 2 to 3 kPa at an input voltage of about 1000 volts applied to said disc assembly.

8. A method for emitting a pressure pulses into a borehole from a LWD logging tool, the method comprising:
- disposing within said borehole a logging tool comprising a least one disc assembly comprising
  - a plurality of piezoelectric discs, and
  - a clamping mechanism cooperating with a first end cap and a second end cap to exert a compressional force upon said disc assembly;
- disposing said at least one disc assembly in a pressure housing in a recess in an outer surface defining a wall of said logging tool;
- polarizing and configuring physically and electrically said discs to emit said pressure pulse from each said disc in each said at least one disc assembly in a common direction upon application of a voltage to said at least one disc assembly;
- disposing said at least one disc assembly in said recess such that the axis of said at least one disc assembly is perpendicular to the major axis of said logging tool;
- providing a first and a second disc assembly;
- providing an arch-shaped mass;
- orienting said first and said second disc assemblies with their axes parallel and radially aligned; and
- acoustically coupling and mechanically connecting said first and said second disc assemblies; wherein
- a first end of said arch-shaped mass functions as said first end cap of said first disc assembly and a second end of said arch-shaped mass functions as said first end cap of said second disc assembly.

9. The method of claim 8 wherein said arch-shaped mass cooperates with said first and said second disc assemblies to direct acoustic energy from said first and said second disc assemblies into borehole environs.

10. The method of claim 8 wherein said first and said second disc assemblies cooperates with said first and said second disc assemblies to direct acoustic energy from that disc assembly radially outward from said major axis of said logging tool.

11. The method of claim 8 further comprising dimensioning and configuring said said first and said second disc assemblies to emit an acoustic pulse at a predetermined pressure and at a predetermined frequency upon application of a voltage to said at least one disc assembly.

12. The method of claim 8 further comprising dimensioning and configuring said first and said second disc assemblies to operate at a frequency of about 8 to 15 KHz.

13. The method of claim 8 further comprising dimensioning and configuring said first and said second disc assemblies to yield a pressure output in a range of 2 to 3 KPa at an input voltage of about 1000 volts applied to said disc assembly.

14. The method of claim 8 further comprising bonding major surfaces said discs in each of said first and said second disc assemblies with intervening layers of conducting material.

* * * * *

UNITED STATES PATENT AND TRADEMARK OFFICE
CERTIFICATE OF CORRECTION

| | | |
|---|---|---|
| PATENT NO. | : 7,864,629 B2 | Page 1 of 1 |
| APPLICATION NO. | : 11/943185 | |
| DATED | : January 4, 2011 | |
| INVENTOR(S) | : Dale A. Jones et al. | |

It is certified that error appears in the above-identified patent and that said Letters Patent is hereby corrected as shown below:

Column 10, line 53, in claim 4, after "wherein", delete first "said".
Column 12, line 12, in claim 11, after "configuring", delete first "said".

Signed and Sealed this
Sixth Day of December, 2011

David J. Kappos
*Director of the United States Patent and Trademark Office*